United States Patent Office 3,291,587
Patented Dec. 13, 1966

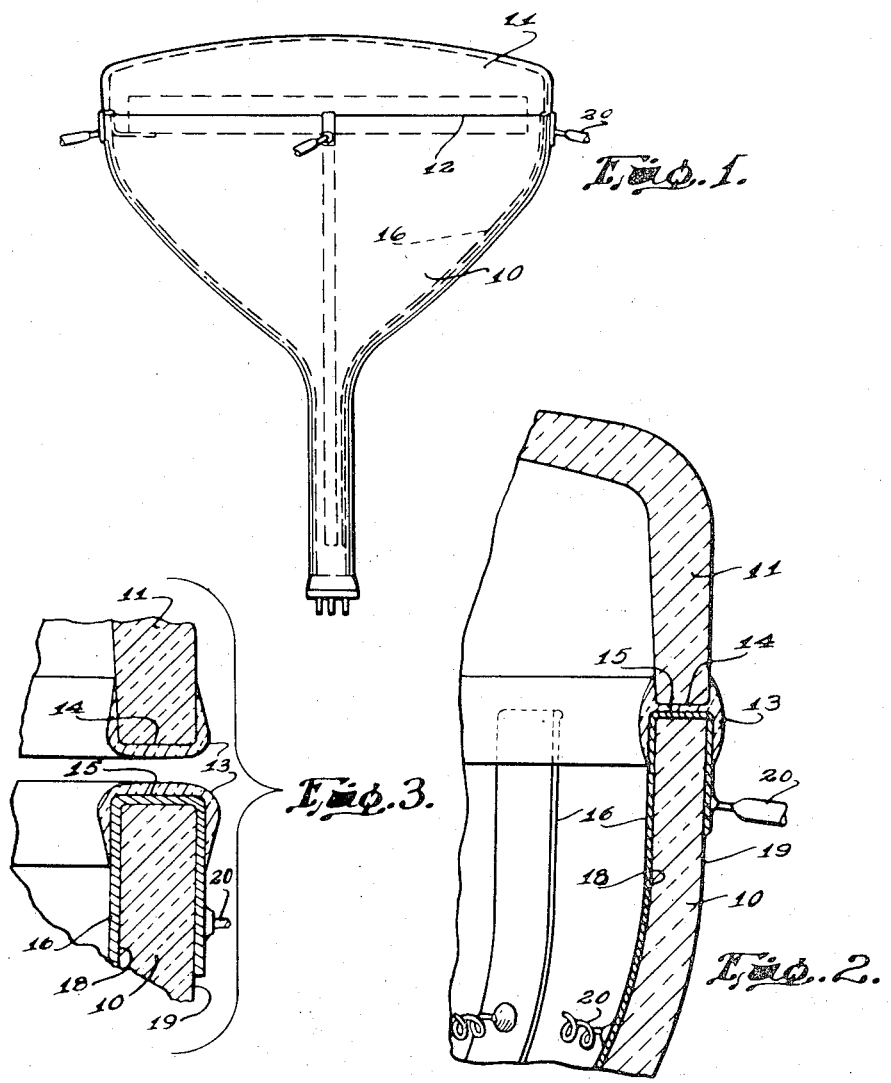

3,291,587
HERMETICALLY SEALING GLASS PARTS INCLUDING INTERVENING ELECTRICAL CONDUCTOR
Harry F. Loehrke, Toledo, and Arthur F. Van Zee, Elmore, Ohio, assignors to Owens-Illinois, Inc., a corporation of Ohio
Continuation of application Ser. No. 302,753, July 5, 1963, which is a continuation of application Ser. No. 643,160, Feb. 28, 1957. This application Aug. 6, 1965, Ser. No. 477,818
3 Claims. (Cl. 65—43)

This application is a continuation of application Serial No. 302,753 filed July 5, 1963, now abandoned which is a continuation of Serial No. 643,160 filed February 28, 1957, now abandoned.

The present invention generally relates to extending electrical conductors through glass walls such as in television bulbs where an electrical connection is made between a conducing surface inside the bulb and an external circuit.

More specifically, the present invention is concerned with sealing two glass parts together to form a unitary structure or wall with an electrical conductor extended through the wall at the sealing joint between the component glass parts. While not limited thereto, the invention is particularly useful where the electrical conductor is applied in the form of a painted strip extending across the marginal edge of one of the parts and along its opposite sides, such as disclosed in U.S. patent to Goodwin, No. 2,814,165 issued November 26, 1957.

Because of the electrical conductor between the glass parts, hermetic sealing of the parts has proven to be difficult, if not unattainable, with conventional glass sealing methods such as direct bonding or fusion. One known cause of this problem is that in sealing by direct fusion, the glass parts often are not melted sufficiently to flow and seal against the edges of the conductor strip. The result is that air bubbles form along the edges of the conducting strip to destroy the hermetic seal. Another cause of air leakage between the glass parts may also stem from irregularities in the surface of the electrical conductor strip.

In an attempt to eliminate air leakage along the edges of the conductor strip, Goodwin, as disclosed in his patent above-identified, bevels the edges of the conductor strip. This method however, is limited to conducting strips of only minimal thickness and consequent current-carrying capacity. Furthermore, a certain measure of control is required to ensure that the bevel is sufficient to permit fusion over the edges of the conductor strip. Moreover, Goodwin's method will not compensate for irregularities in the surface of the conductor strip.

In contrast to Goodwin's bevelling method, the present invention overcomes the noted sealing problem in an entirely different manner which is believed to be more effective, particularly from the standpoint of providing a more versatile and reliable seal regardless of whether the conductor strip contains sharp edges or irregularities in its surface.

Accordingly, it is an object of the present invention to provide an improved method for hermetically sealing two glass parts into a unitary structure with an electrical conductor strip extending and hermetically sealed between the parts.

A further object of the present invention is to provide a method for hermetically sealing glass parts with an included conductor strip, which method may be effectively utilized with conductor strips of various thicknesses and current capacities regardless of surface irregularities or edges presented by the conductor strip.

A still further object of the present invention is to provide such an improved method of hermetically sealing glass parts, which may be employed commercially in mass production utilizing standard or readily available sealing substances while requiring no special skill.

Other objects and advantages of the present invention will become apparent from the following description and the accompanying drawings in which:

FIG. 1 is an elevational view of a television bulb to which conducting strips are applied in accordance with our invention;

FIG. 2 is a fragmentary sectional view on a larger scale; and

FIG. 3 is a fragmentary view showing a step in the method of sealing the glass parts together.

While the present invention may be used in connection with glass bulbs and other glass articles or structures, it has particular utility in connection with television bulbs as illustrated and now to be described.

As shown in FIG. 1, the invention is applied to a television picture tube comprising a funnel-shaped body 10 and a face plate 11, said parts being sealed together at the plane of the line 12. The parts are sealed together by means of a comparatively low melting glass 13, commonly called "solder glass." Preferably, the solder glass is applied to each of the marginal surfaces 14 and 15 by dipping the surfaces in a bath of the molten solder glass, thereby applying a layer of the solder glass to the marginal portions of the funnel body 10 and cover face 11, including opposite internal and external side portions of parts 10 and 11 as shown in FIG. 3. The parts are then brought together while the solder glass is in a molten condition with the solder glass completely covering the marginal surfaces 14 and 15 including the portions of the conductor strip extending between surfaces 14 and 15 as well as adjacent portions of the conductor strip located on opposite internal and external side portions of parts 10 and 11 as shown in FIG. 2. In this manner there is obtained a highly reliable, improved hermetic seal.

Any of the solder glasses of the prior art may be used in practicing our invention. Examples of such glasses are given in the copending application of Francl et al., filed January 10, 1955, Serial No. 481,008 "Low Temperature Glass Sealing Composition," now abandoned.

Any approved means or apparatus for applying the solder glass as a preliminary step in the sealing operation may be used with our invention. For a disclosure of a particular apparatus for this purpose, reference may be had to the copending application of Colehagoff, Serial No. 530,329, filed August 24, 1955, "Apparatus for Applying Sealing Compositions to Glass Parts," now U.S. Patent No. 2,822,777.

Before dipping or applying the solder glass 13, one or more strips 16 of electrically conducting material are applied to one of the parts which are to be sealed together. As shown in the drawings, the strips 15 are applied to the funnel body 10. The conducting material may be applied in the form of a paint, with the strip extending along the inner surface 18 of the funnel body, over the sealing edge surface 15 and along the outer surface 19. The conducting strips 16 may be made of or include any one of various materials such as conducting silver paste, liquid bright gold, gold decorating paste, gold powder, burnished gold, liquid bright platinum, liquid bright palladium, or any other of the usual preparations used for applying metal decorations to glass.

Any of the prior art methods may be used for applying the conducting strips to the glass. Examples of such methods are set forth in detail in the copending application by Veres, Serial No. 629,811, now abandoned, filed December 21, 1956, "Method of Applying Conductive Metal Coating to Glass."

The edge surfaces 14 and 15 which are to be sealed together should preferably have the edges rounded or glazed before applying the conducting paint or strip material 16. This pre-glazing or rounding of the edges, although desirable, is not a necessary condition in the use of the present invention. After the conducting strips 16 have been applied, the glass parts may be preheated to prevent breakage before they are dipped in the molten solder glass. This preheating may serve to fire the conducting metal onto the glass or, if preferred, the metal strips may be fired in a separate operation. After the parts are dipped in the solder glass, the marginal surfaces 14 and 15 of the parts are brought together by means of gravity or with a vacuum applied to the bulb or picture tube and subsequently sealed with solder glass covering the parts as described above and shown in FIG. 2. These seals are vacuum-tight and they may be made after any desired number of separate electrical connections or strips 16 have been applied.

The conductive strips 16 may be reinforced and also protected from the glazing flame prior to the dipping operation by being covered with gold foil while the conductive paste or paint is partly dry. The strips 16 may be in the form of a thin layer of material applied to the glass by painting or other methods, the thickness being exaggerated on the drawings for clearness of illustration.

Electrical conductors 20 may be attached to the strip 16 on either the outer or inner sides of the bulbs by soldering. The thickness of the strips 16 may be increased by electro-plating to permit such soldering. Thus, copper, silver, or other metals may be electro-plated over a portion of the gold strips on the outside of the bulb to make a more certain electrical contact.

Modifications may be resorted to within the spirit and scope of our invention.

What is claimed is:

1. The method of producing an article consisting of glass parts sealed together, each of said parts having an inner surface, an outer surface and a marginal sealing surface extending from the inner to the outer surface, said article having an electrically conductive strip extending from the inner surface to the outer surface and across the marginal sealing surface of one of said parts which method consists of applying to one of said parts an adhering strip of electrically conducting material in the form of a paste or paint by painting the strip on said part in the form of a continuous strip extending along the inner surface of said part to the marginal surface, across the marginal surface to the outer surface and along said outer surface and firing to thereby adhere the strip to said part, thereafter applying to the said marginal sealing surfaces and said inner and outer surfaces of both of said parts and the portion of the said strip extending over said marginal surface of said one part, an electrically insulating solder consisting of glass in molten condition, and bringing said sealing surfaces into juxtaposition and thereby hermetically sealing them together with the solder extending across and between said marginal surfaces and along the inner and outer surfaces of both of said parts and over portions of said strip located on said inner and outer surfaces of said one part.

2. The method defined in claim 1, the solder being applied by dipping the marginal portions of said glass parts into a bath of the solder while the latter is in molten condition, the method including preheating the glass parts before dipping them into the bath of solder.

3. A method of sealing the edges of two glass parts together into a unitary wall with an electrically conducting strip extending through said wall between said parts; the steps comprising applying said electrically conducting strip on one of said parts with the strip extending across the edge and on the opposite sides of said one part, applying molten sealing glass to said one part on the entire edge thereof and to opposite sides of said one part adjacent said edge thereof to cover the portion of said strip extending across said edge and portions of said strip on said opposite sides of said edge, bringing the edges of said parts into sealing engagement with the sealing glass extending fully throughout said edges and over said strip and fusing said sealing glass with said edges and opposite sides of both of said parts including portions of said strip on said opposite sides of said one part to form a unitary wall with said strip extended through and hermetically sealed therein.

No references cited.

DONALL H. SYLVESTER, *Primary Examiner.*

D. CRUPAIN, *Assistant Examiner.*